(12) United States Patent
Sarkar et al.

(10) Patent No.: US 10,684,384 B2
(45) Date of Patent: Jun. 16, 2020

(54) SYSTEMS AND METHOD FOR FORMATION EVALUATION FROM BOREHOLE

(71) Applicant: Baker Hughes Oilfield Operations LLC, Houston, TX (US)

(72) Inventors: Debashish Sarkar, Oklahoma City, OK (US); Michael Wells, Oklahoma City, OK (US); Stewart Blake Brazil, Oklahoma City, OK (US); James Verna Leggett, III, Fort Collins, CO (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 89 days.

(21) Appl. No.: 15/604,480

(22) Filed: May 24, 2017

(65) Prior Publication Data

US 2018/0341036 A1    Nov. 29, 2018

(51) Int. Cl.

| | |
|---|---|
| *G01V 1/52* | (2006.01) |
| *G01V 1/48* | (2006.01) |
| *E21B 49/00* | (2006.01) |
| *E21B 47/00* | (2012.01) |
| *G01V 1/46* | (2006.01) |

(52) U.S. Cl.
CPC ............ *G01V 1/52* (2013.01); *E21B 47/0002* (2013.01); *E21B 49/00* (2013.01); *G01V 1/46* (2013.01); *G01V 1/48* (2013.01)

(58) Field of Classification Search
USPC ..................................................... 73/152.58
See application file for complete search history.

(56) References Cited

U.S. PATENT DOCUMENTS

| | | |
|---|---|---|
| 2,951,535 A | 9/1960 | Mihram et al. |
| 4,744,245 A | 5/1988 | White |

(Continued)

FOREIGN PATENT DOCUMENTS

| | | |
|---|---|---|
| WO | 9206391 A1 | 4/1992 |
| WO | 2010/121200 A1 | 10/2010 |

OTHER PUBLICATIONS

Takahashi, Toru; "Prestack migration using arrival angle information;" Geophysics, vol. 60, No. 1; Jan. 1995; pp. 154-163.

(Continued)

*Primary Examiner* — Clayton E. LaBalle
*Assistant Examiner* — Warren K Fenwick
(74) *Attorney, Agent, or Firm* — Cantor Colburn LLP

(57) ABSTRACT

A downhole measurement tool configured to be run through a bore includes a source and a 3-component receiver. The source is configured to emit a signal into a volume of material surrounding the bore. The source signal propagates through the material surrounding the bore and reflects off of features within the material surrounding the bore. The three-component receiver includes a first, a second, and a third element. The first element is oriented in a first plane, orthogonal to an axis of the bore, and receives a first component of the set of reflections of the source signal. The second element is oriented in the first plane, orthogonal to the first element, and receives a second component of the set of reflections of the source signal. The third element is oriented parallel to the axis and receives a third component of the set of reflections of the source signal.

16 Claims, 6 Drawing Sheets

(56) References Cited

U.S. PATENT DOCUMENTS

| | | | | |
|---|---|---|---|---|
| 5,121,363 | A | * | 6/1992 | Benzing ............... G01V 1/52 181/105 |
| 5,124,952 | A | | 6/1992 | Knize et al. |
| H001156 | H | | 3/1993 | Siegfried, II |
| 5,318,123 | A | | 6/1994 | Venditto et al. |
| 5,363,095 | A | * | 11/1994 | Normann ............ E21B 47/123 299/1.05 |
| 5,747,750 | A | * | 5/1998 | Bailey ..................... G01S 5/20 175/50 |
| 6,573,722 | B2 | * | 6/2003 | Rosthal .................. G01V 3/28 324/338 |
| 6,636,045 | B2 | * | 10/2003 | Tabarovsky ............ G01V 3/38 324/343 |
| 6,839,633 | B1 | | 1/2005 | Basaki et al. |
| 6,947,843 | B2 | | 9/2005 | Fisher et al. |
| 6,985,816 | B2 | * | 1/2006 | Sorrells .................. G01V 1/30 702/14 |
| 7,035,165 | B2 | * | 4/2006 | Tang ..................... G01V 1/44 367/28 |
| 7,165,616 | B2 | | 1/2007 | Jørgensen |
| 7,243,718 | B2 | | 7/2007 | Chen et al. |
| 7,660,194 | B2 | * | 2/2010 | Uhl ...................... G01V 1/008 181/106 |
| 8,117,907 | B2 | * | 2/2012 | Han .................... E21B 47/082 73/152.58 |
| 8,437,962 | B2 | | 5/2013 | Craig |
| 8,596,354 | B2 | | 12/2013 | Hartshorne et al. |
| 8,754,362 | B2 | | 6/2014 | Smaardyk et al. |
| 8,950,482 | B2 | | 2/2015 | Hill et al. |
| 9,176,245 | B2 | | 11/2015 | Craig |
| 9,243,491 | B2 | | 1/2016 | McDaniel et al. |
| 9,267,359 | B2 | | 2/2016 | Smaardyk et al. |
| 9,507,047 | B1 | * | 11/2016 | Dvorkin ................ G01V 5/101 |
| 9,784,863 | B2 | * | 10/2017 | Bansal .................. G01V 1/284 |
| 2003/0101806 | A1 | * | 6/2003 | Kurkoski ............... G01V 5/125 73/152.02 |
| 2003/0174581 | A1 | | 9/2003 | Parra et al. |
| 2003/0195705 | A1 | | 10/2003 | Leaney |
| 2009/0010104 | A1 | | 1/2009 | Leaney |
| 2010/0017134 | A1 | * | 1/2010 | Steinman ............... E21B 43/04 702/8 |
| 2010/0157737 | A1 | | 6/2010 | Miller et al. |
| 2014/0056101 | A1 | | 2/2014 | Vu et al. |
| 2014/0333310 | A1 | * | 11/2014 | Lozinsky ................ G01B 7/14 324/346 |
| 2014/0369165 | A1 | | 12/2014 | Sinha |
| 2015/0013974 | A1 | | 1/2015 | Mekic et al. |
| 2015/0073714 | A1 | | 3/2015 | Foy |
| 2015/0107903 | A1 | * | 4/2015 | Sugiura ................ E21B 44/005 175/45 |
| 2015/0135819 | A1 | * | 5/2015 | Petrella ................. G01V 1/40 73/152.58 |
| 2015/0285936 | A1 | | 10/2015 | Sinha et al. |
| 2015/0338542 | A1 | * | 11/2015 | Donderici ............... G01V 3/26 702/7 |
| 2016/0146963 | A1 | | 5/2016 | Hall et al. |

OTHER PUBLICATIONS

Takahashi, Toru, et al.; "A field experiment of single-well seismic imaging at a heterogeneous rock site;" Society of Exploration Geophysicists Annual Meeting, Oct. 1999, 4 pages.

Tang, Xiao-Ming, et al.; "Single-well S-wave imaging using multicomponent dipole acoustic-log data;" Geophysics, vol. 74, No. 6; Nov. 2009; pp. 211-223.

Gong, Hao, et al.; Eliminating the azimuth ambiguity in single-well imaging using 3C sonic data; Geophysics, vol. 80, No. 1; Jan. 2015; pp. 13-17.

International Search Report and Written Opinion issued in connection with corresponding PCT Application No. PCT/US18/31716 dated Aug. 29, 2018.

\* cited by examiner

SYSTEMS AND METHOD FOR FORMATION EVALUATION FROM BOREHOLE

BACKGROUND

The subject matter disclosed herein relates to subterranean formation evaluation, and more specifically to evaluating geological formations disposed about a hydrocarbon extraction borehole.

Subterranean hydrocarbon deposits may be accessed by drilling a bore that extends from the surface of the earth to the hydrocarbon deposit, and then pumping hydrocarbons up to the surface through the bore. In some applications, a measurement tool may be run through the bore after the bore has been drilled to take measurements of the bore or the earth disposed immediately around the bore. However, because such systems are designed to measure formation properties along the axis of borehole they are inadequate for evaluating the formation far away from the borehole. Formation evaluation methods that depend on elastic wave propagation normally focuses on the refracted wave propagating along the walls of the borehole and other wavemodes that propagate within the bore along its axis. Microfractures and major fracture planes that extend tens of meters away from the borehole cannot be investigated with such conventional tools and methods. It would be beneficial to design a measurement tool capable of detecting small and large fractures that extend tens of meters away from the borehole that may act as storage or pathways for hydrocarbons.

BRIEF DESCRIPTION

Certain embodiments commensurate in scope with the original claims are summarized below. These embodiments are not intended to limit the scope of the claims, but rather these embodiments are intended only to provide a brief summary of possible forms of the claimed subject matter. Indeed, the claims may encompass a variety of forms that may be similar to or different from the embodiments set forth below.

In one embodiment, a downhole measurement tool configured to be run through a bore includes a source and a 3-component receiver. The source is configured to emit a source signal, which may be a compressional or a shear wave, into a volume of material surrounding the bore. The source signal propagates through the volume of material surrounding the bore and reflects off of features disposed within the volume of material surrounding the bore. The three-component receiver includes a first element, a second element, and a third element. The first element is oriented in a first plane, orthogonal to an axis of the bore, and receives a first component of the set of reflections of the source signal. The second element is oriented in the first plane, orthogonal to the first element, and receives a second component of the set of reflections of the source signal. The third element is oriented parallel to the axis and receives a third component of the set of reflections of the source signal.

In a second embodiment, a system includes a downhole measurement tool and a computing device. The downhole measurement tool is run through a bore and includes a source and a three-component receiver. The source emits a source signal into a volume of material surrounding the bore. The source signal propagates through the volume of material surrounding the bore and reflects off of features disposed within the volume of material surrounding the bore. The three-component receiver includes a first element, a second element, and a third element. The first element is oriented in a first plane, orthogonal to an axis of the bore, and receives a first component of the set of reflections of the source signal. The second element is oriented in the first plane, orthogonal to the first element, and receives a second component of the set of reflections of the source signal. The third element is oriented parallel to the axis, and receives a third component of the set of reflections of the source signal. The downhole measurement tool acquires the received first, second, and third sets of components of the reflections of the source signal. The computing device analyzes the received first, second, and third components of the sets of reflections of the source signal for formation evaluation and generates one or more images of the volume of material surrounding the bore based on the first, second, and third component sets of reflections of the source signal.

In a third embodiment, a method includes running a downhole measurement tool through a bore, emitting, via a source of the downhole measurement tool, a source signal into a volume of material surrounding the bore, wherein the source signal is configured to propagate through the volume of material surrounding the bore and reflect off of features disposed within the volume of material surrounding the bore, receiving, via a first element of a three-component receiver, a first component set of reflections of the source signal, wherein the first element is oriented in a first plane, orthogonal to an axis of the bore, receiving, via a second element of the three-component receiver, a second component set of reflections of the source signal, wherein the second element is oriented in the first plane, orthogonal to the first element, and receiving, via a third element of the three-component receiver, a third component set of reflections of the source signal, wherein the third element is oriented parallel to the bore axis.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

The disclosed techniques include utilizing a measurement tool that includes a source and a three-component receiver. As the measurement tool moves through a bore, the source emits a signal outward into the material surrounding the bore. The signal reflects off features in the material and back toward the bore. The receiver receives the compressive component and the two shear components of the reflected signal. The collected data may be used to create 2D and 3D images of the material surrounding the bore for performing formation evaluation.

Figure 1:
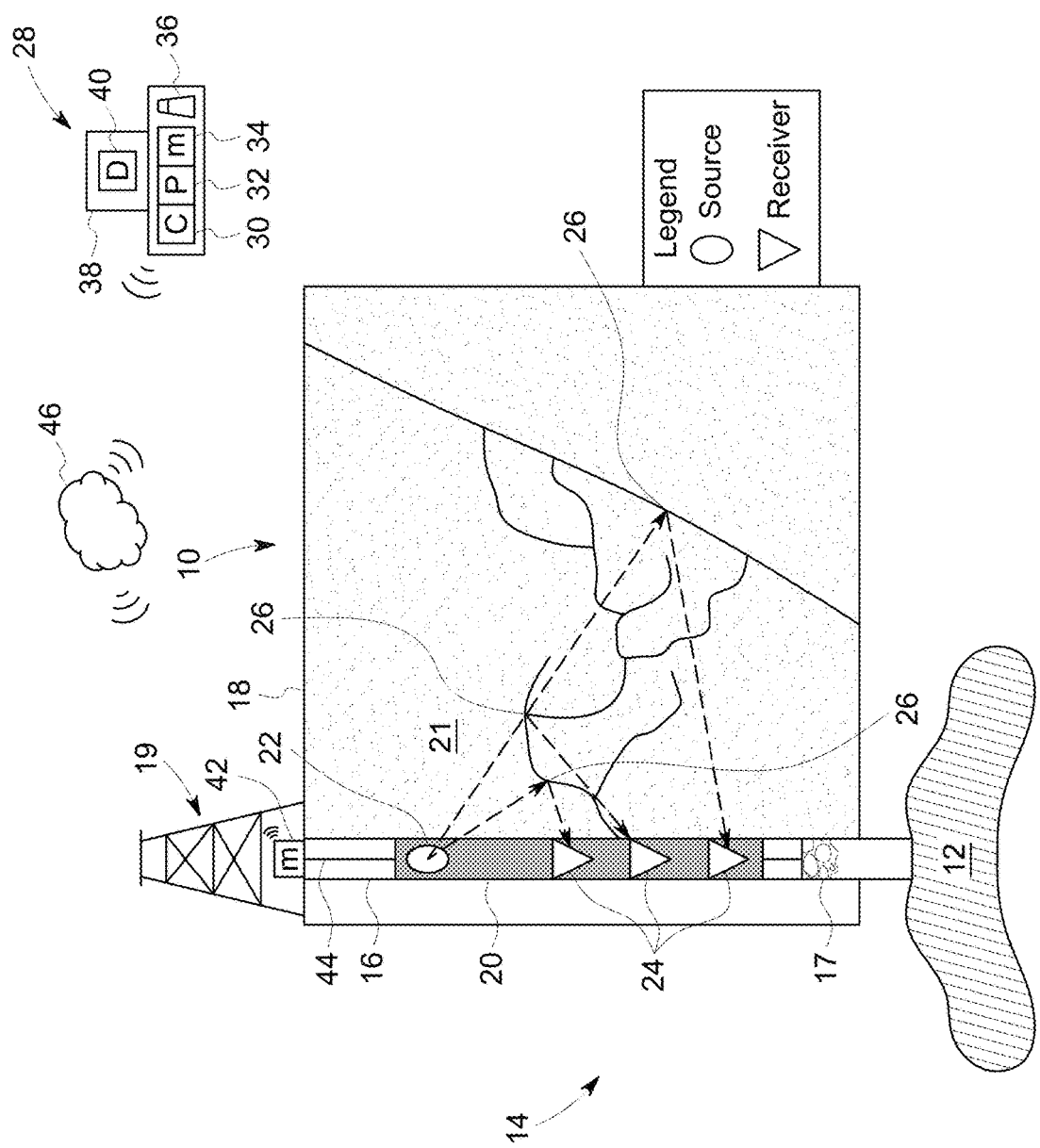
FIG. 1 is a schematic of a mineral extraction system, in accordance with an embodiment.

FIG. 1 is a schematic of an embodiment of a mineral extraction system 10. Oil and/or gas may be accessed from subterranean mineral deposits 12 via a well 14. For example, a bore 16 may drilled using a drilling tool 17 (e.g., drill bit), extending from the surface 18 to the mineral deposit 12. Though the bore 16 shown in FIG. 1 extends vertically from a drilling rig 19 at the surface 18 to the mineral deposit 12, the bore 16 may extend at an angle oblique to the surface 18. Similarly, the bore 16 may change directions as it extends from the surface 18 to the mineral deposit 12. That is, the bore 16 may include portions that extend oblique to, perpendicular to, or parallel to the surface 18. A measurement tool 20 may be inserted into the bore 16 behind the drilling tool 17 for taking measurements of, or imaging, a volume of material 21 surrounding the bore 16 for formation evaluation. The measurement tool 20 may be run down the bore 16 behind the drilling tool 17 and measurements taken as the bore 16 is drilled (logging while drilling, or LWD). In other embodiments, the measurement tool 20 may be run down the bore 16 after the bore 16 has been drilled and measurements taken as the measurement tool 20 is pulled back up through (e.g., retrieved from) the bore 16 (wireline logging). In further embodiments, the measurement tool 20 may be run down the bore 16 after the bore 16 has been drilled and measurements taken as the measurement tool 20 is pulled back up through the bore 16 while pipe is being removed from the bore 16 (logging while tripping, LWT).

The measurement tool 20 may include one or more sources 22 that emit a signal that propagates through the earth, and one or more receivers 24 that receive signals reflected off of features 26 (e.g., planar fractures, microfractures, faults, bedding planes, and other scatterers) within the volume of material 21 around the bore 16. Data collected using the measurement tool 20 may be analyzed using a computing device 28 (e.g., computer, tablet, mobile device, etc.), or a combination thereof. The computing device 28 may include communication circuitry 30, a processor 32, memory 34, communication ports 36, and a user interface 38, which may include a display 40. While the measurement tool 20 is being passed through the bore 16 to take measurements, or following the measurement tool 20 being passed through the bore 16, data may be passed to a memory component 42 (e.g., via cable 44), which may be located at the surface 18, or within the measurement tool 20, for storage until the data is processed. In other embodiments, collected data may be passed to the computer 28 wirelessly (e.g., via the cloud 46) or through a wired connection via communication ports 36. The computer 28 may be located near the drilling rig 19 or remote from the well 14. In some embodiments (e.g., the computer 28 is located remotely relative to the well 14), the data may be passed to the computer 28 via the cloud 46 or over a network. In other embodiments, the computer 28 may be in wireless communication with the measurement tool 20 while the measurement tool 20 is traveling through the bore 16 and analyzing data in real time or near real time. In some embodiments, the operation of the measurement tool 20 may be adjusted based on analysis by the computing device 28 (e.g., dynamic software). The computer 28 may be outfitted with software stored on the memory component 34 and executed by the processor 32 to facilitate analysis of the collected data. For example, the computing device 28 may be capable of post-processing the data collected by the measurement tool 20, and identify features 26 in the volume of material 21 surrounding the bore 16. Based on reflected signals received by the receivers 24, 2D and 3D imaging of the volume of material 21 surrounding the bore 16 may be performed.

Figure 2:
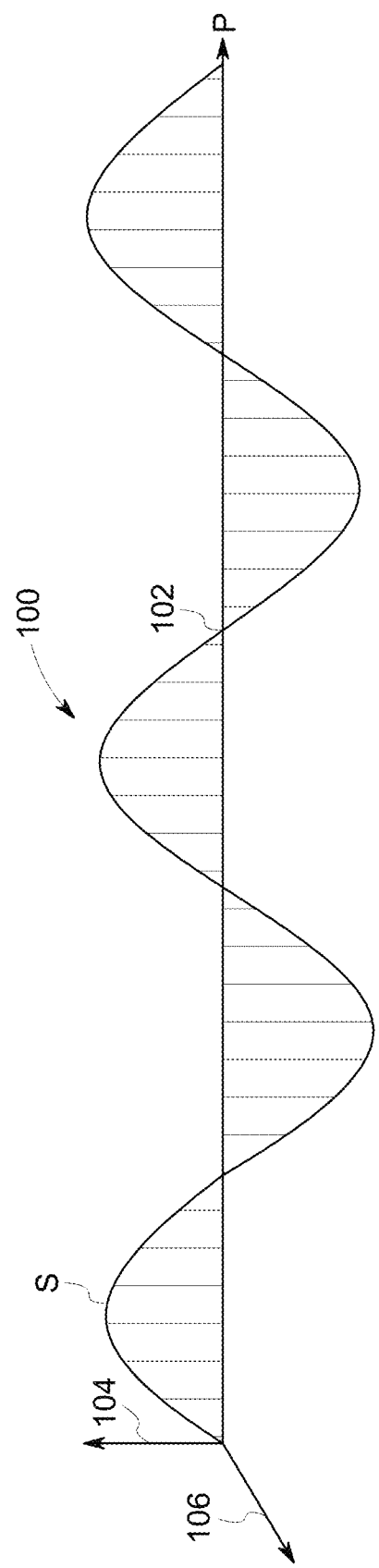
FIG. 2 is an illustration of a signal propagating through an isotropic material, in accordance with an embodiment.

FIG. 2 is an illustration of a signal 100 propagating through an isotropic material. As shown, the signal includes a compression component, P, and a shear component, S. The compression component, P, extends axially along the axis of travel 102. The shear component, S, acts orthogonal to the axis of travel 102. In the illustrated embodiment, the shear component, S, is oriented along axis 104. However, it should be understood, that the shear component, S, may be oriented along axis 106, or in any other direction. When the signal 100 propagates through an anisotropic or birefringent material, the shear component splits into first and second shear components, S1 and S2, which are generally polarized orthogonal to one another along a given raypath in subsurface earth formations.

Figure 3:
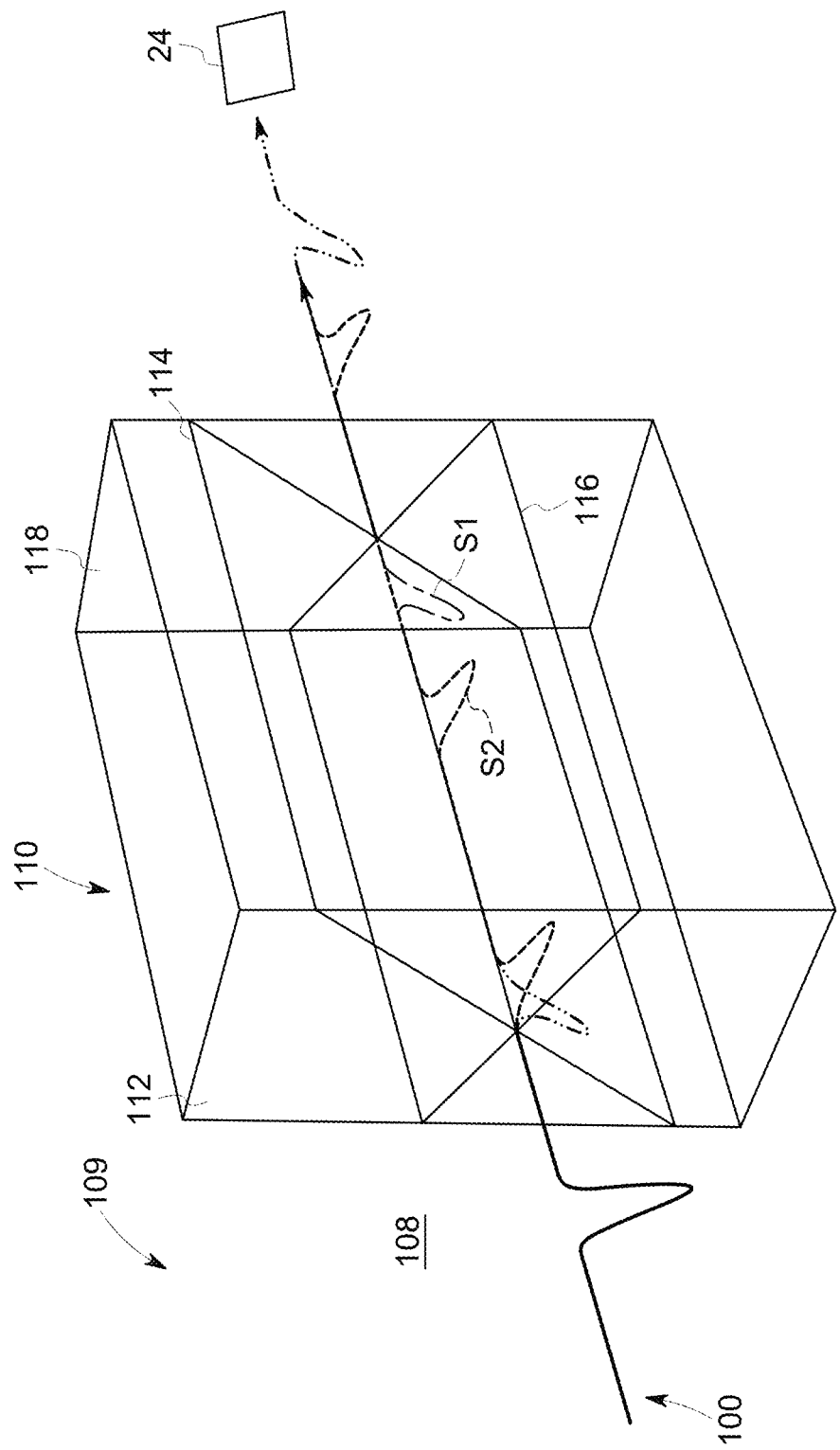
FIG. 3 is an illustration of birefringence in an anisotropic material, in accordance with an embodiment.

FIG. 3 is an illustration of shear signal splitting in anisotropic materials. As illustrated, a signal propagates through an isotropic material 108, passes through an anisotropic material 110, and then exits the anisotropic material 110 back into the isotropic material 108. As shown and described with regard to FIG. 2, the signal propagates through the isotropic material 108 as a single signal with pressure component P, and a shear component, S, oriented along plane 109 intact as a single signal 100. The signal 100 contacts a front plane 112 of the anisotropic material 110 and the shear component, S, splits into two polarized components, S1 and S2, because the refractive index of the anisotropic material 100 depends on polarization of the signal 100. The first shear component, S1, polarized about a first plane 114, propagates at a first speed according to a first refractive index of the anisotropic material 110, while the second shear component, S2, polarized about a second plane 116, propagates at a second speed according to a second refractive index of the anisotropic material 110. The first shear component, S1, and the second shear component, S2, reach a back plane 118 of the anisotropic material 110 at different times and exit the anisotropic material 110 into the isotropic material 108. Thus, what began as the shear component, S, of the signal 100 is received by the receiver 24 as first and second shear components, S1 and S2, which arrive at different times.

If the medium is isotropic the received shear waves are polarized in the plane of propagation containing the reflection point. To completely capture such arrivals an axially oriented receiver is used. It should be noted that the conventional cross-dipole geometry does not record this component of the wavefield. When stresses, planar fractures, microfractures are present in the volume of material 21 surrounding the bore 16, as shown in FIG. 1, the volume of material 21 becomes anisotropic and birefringent. As such, signals 100 emitted by the one or more sources 22, reflected by features 26 in the volume 21, and received by the one or more receivers 24 will be split into a pressure compressive component, P, and first and second shear components, S1 and S2, which arrive at different times. Thus, receiving the full wave field of the reflected signal P, S1, S2, and capturing them with a 3 component receiver results in the most complete formation evaluation of the volume of material 21 surrounding the bore 16.

Figure 4:
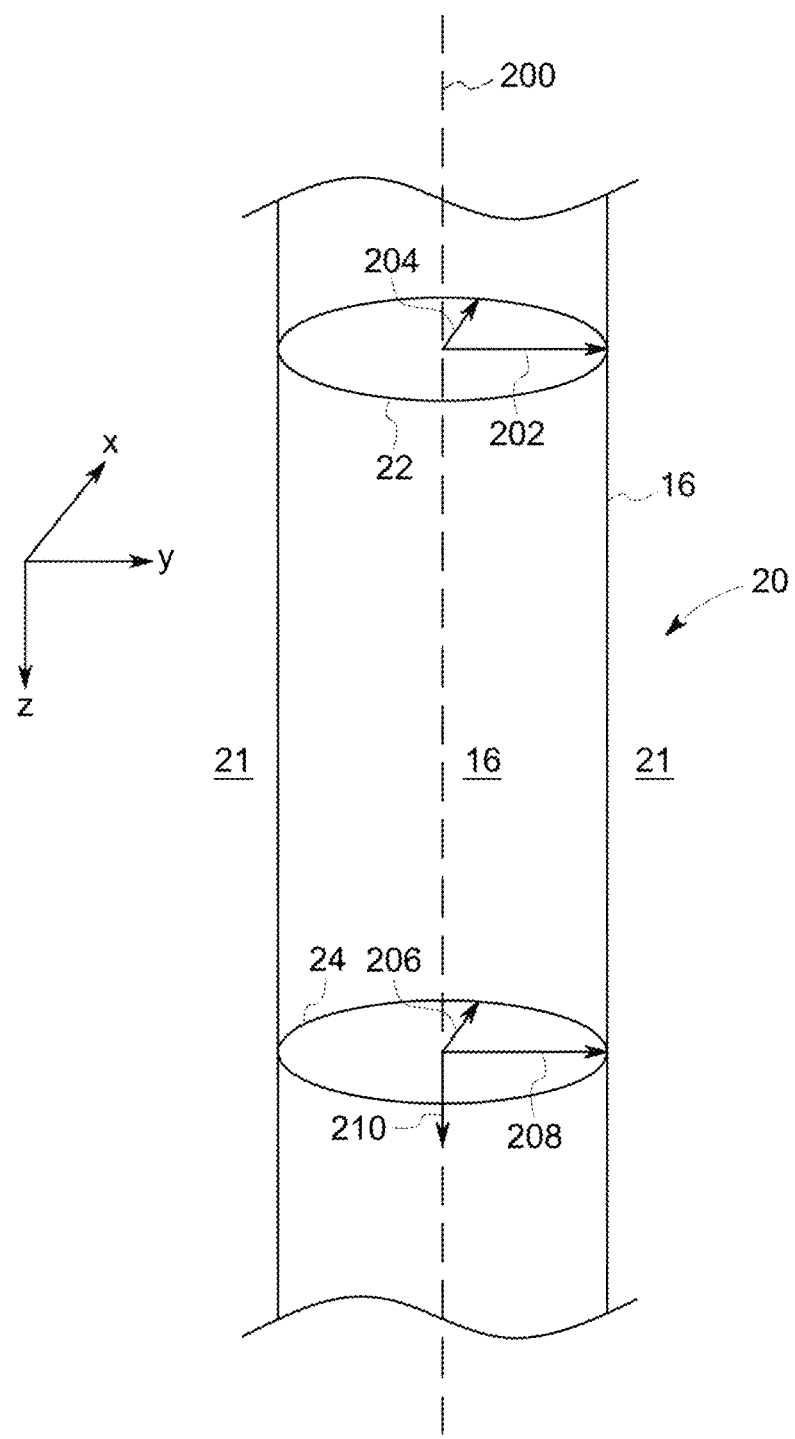
FIG. 4 is a schematic view of a measurement tool disposed within a bore of the mineral extraction system of FIG. 1, in accordance with an embodiment.

FIG. 4 is a schematic view of the measurement tool 20 of FIG. 1 disposed within the bore 16, in accordance with an embodiment. For clarification, an axis 200 of the bore 16 is shown. Though the bore 16 is shown in FIG. 4 extending vertically, it should be understood that the bore 16 may extend horizontally or at an angle oblique to the surface 18 of the earth. Similarly, as the bore 16 changes directions, so too does the bore axis 200. An X, Y, Z coordinate system is also shown in FIG. 4. For the sake of simplicity, it should be understood that the coordinate system also mirrors changes in direction of the bore 16 such that the bore axis 200 always extends in the Z direction.

As shown, the measurement tool 20 includes a source 22 and a receiver 24. As previously discussed, the measurement tool 20 may include multiple sources 22 and multiple receivers 24. Similarly, the source 22 and the receiver may be a part of the same module or assembly, or part of separate modules or assemblies. The source 22 may be any device that can be excited electrically or mechanically to generate compressional or shear waves out into the volume of material 21 surrounding the bore 16. FIG. 4 illustrates a particular instance of the source that is commonly used in cross-dipole geometries. However, other multi-mode systems having 4, 6, 8, or more poles may also be possible. Here the source emits a signal in a plane parallel to the XY plane and orthogonal to the bore axis 200 into the volume of material 21 surrounding the bore 16, as evidenced by arrows 202 and 204. However, the source 22 may be any number of devices capable of emitting a signal into the volume of material 21 surrounding the bore 16. For example, the source 22 may be any vibrational source that may be electrically or mechanically activated to generate compressional and shear waves. The source 22 may be capable of operating as a monopole, a dipole, or both, for example. The signal penetrates deep (e.g., 30, 40, or 50 meters or more) into the volume of material 21 surrounding the bore 16 such that fractures of a wide range of sizes may be detected. For example, the signal may have a frequency greater than 1 KHz.

The receiver 24 is a sensor capable of receiving the P, S1, and S2 components of the reflected signal. For example, the receiver 24 may have first and second elements, indicated by arrows 206 and 208, respectively, oriented in a plane parallel to the XY plane and orthogonal to the bore axis 200. A third element, indicated by arrow 210, may be oriented parallel to the bore axis 200. As previously discussed with regard to FIG. 2, the P component of the reflected signal travels along the axis of propagation. For isotropic media the shear component, S, is polarized in the plane of propagation. For anisotropic media the shear wave splits into two polarized components, S1 and S2. As such, the first and second elements 206 208, oriented in the plane orthogonal to the bore axis 200, receive primarily the P component and the S2 component of the reflected signal. The third element 210, oriented parallel to the bore axis 200, receives the S1 component. In some embodiments, the receiver 24 may be a three-component (3C) sensor (e.g., a three-axis magneto resistive sensor, a piezo electric sensor, magnetorestrictive, capacitive sensor, MEMS sensors, etc.). In other embodiments, the receiver 24 may include one or more geophones or accelerometers. Further, the receiver 24 may include multiple sensors, either in a single package or in separate packages. As previously discussed, though the measurement tool 20 shown in FIG. 4 has a single source 22 and a single receiver 24, it should be understood that embodiments having multiple sources 22, multiple receivers 24, or a combination thereof, are also envisaged.

The measurement tool 20 may be run through the bore 16 to take measurements of the volume of material 21 surrounding the bore 16. Measurements may be taken as the measurement tool 20 moves through the bore 16 toward the hydrocarbon deposit and away from the surface, or as the measurement tool 20 moves through the bore 16 toward the surface and away from the hydrocarbon deposit. Data acquisition may be continuous as the measurement tool 20 moves through the bore 16, or data acquisition may occur at discrete locations as the measurement tool 20 moves through the bore 16. As discussed with regard to FIG. 1, analysis of the collected data may occur aboard the measurement tool in real time or near real time, or the data may be collected and passed to an external computing device for analysis.

Existing systems typically utilize crossed-dipole sources (i.e., two dipole antennas positioned orthogonal to one another) to emit a signal and a two-component receiver with both elements aligned within a plane orthogonal to the bore axis 200. As a result, the two-component receiver only receives the P and S2 components of the reflected signal. The S1 component, which travels perpendicular to the bore axis 200 and is polarized and a plane parallel to the bore axis 200, and in most cases the most dominant arrival, is not fully captured. As such, the effective direction of measurement is only along bore axis 200 and measurements can only be taken a few meters into the volume of material 21 surrounding the bore 16. Utilizing a three-component receiver 24, as shown in FIG. 3, allows the measurement tool 20 to capture all three components (i.e., P, S1, and S2) of the reflected signals, such that the effective directions of measurement are both along the bore axis 200 and radially outward from the bore axis 200, enabling formation evaluation deep into the volume of material 21 surrounding the bore 16. For example, using the disclosed techniques, formation evaluation may be performed a distance of up to 50 meters or more into the volume of material 21 surrounding the bore 16. Once data is collected by the measurement tool 20, 2D or 3D images may be generated for the volume of material 21 surrounding the bore 16.

Figure 5:
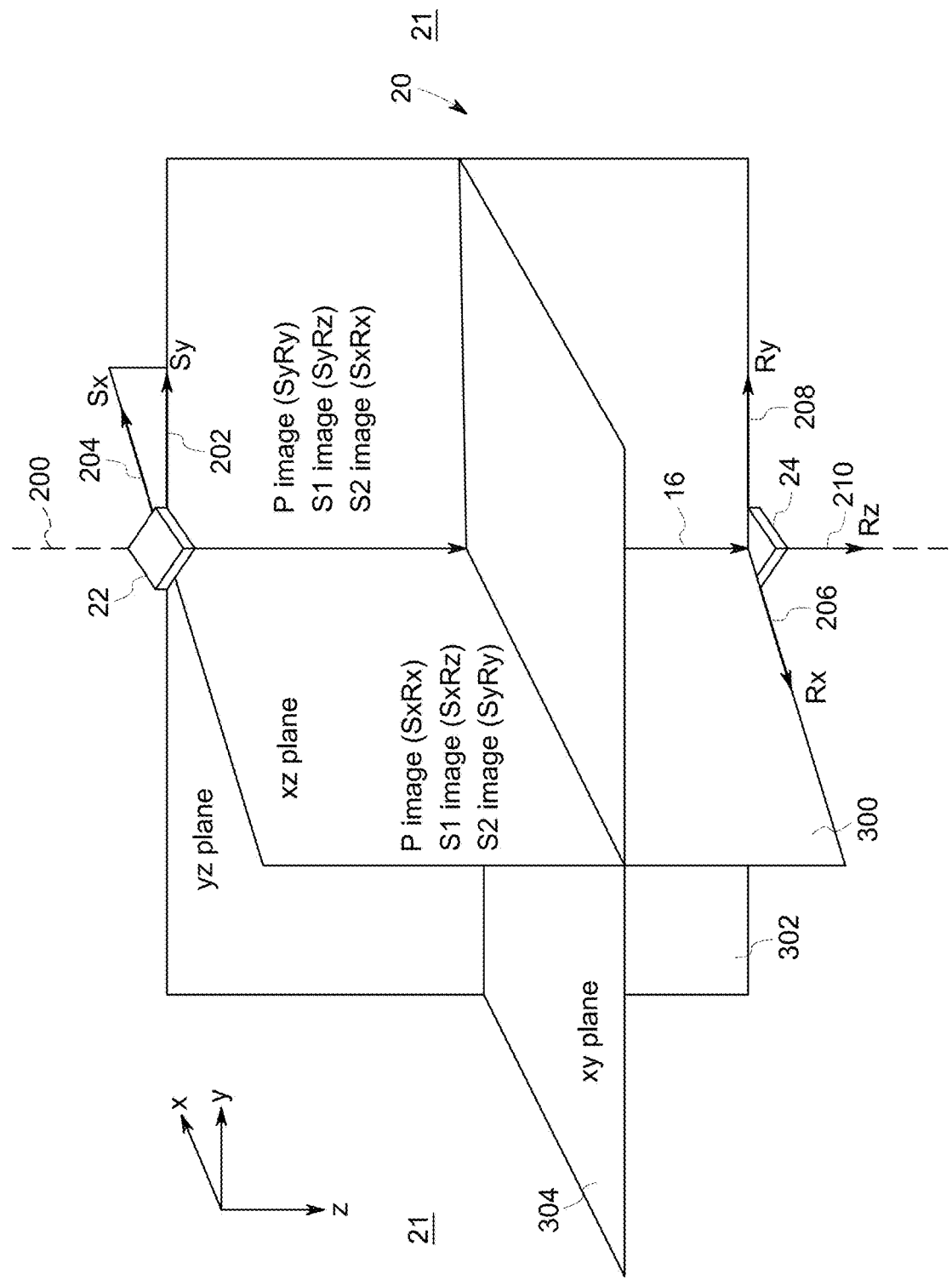
FIG. 5 is an illustration of various planes used for 2D imaging once data has been collected, in accordance with an embodiment.

For cross-dipole sources, FIG. 5 shows the various planes used for 2D imaging once data has been collected. Though 3D imaging provides better quality images of the volume of material 21 surrounding the bore, 3D imaging may take more processing power than 2D imaging. Accordingly, in some embodiments (e.g., when processing power is limited), 2D imaging may be performed prior to 3D imaging or instead of 3D imaging. As shown, the bore 16 and the bore axis 200 extend along the line at the intersection of the XZ plane 300 and the YZ plane 302. The XY plane 304 extends outward orthogonal to the bore axis 200. As described with regard to FIG. 4, it should be understood that as the bore 16 changes directions, so do the bore axis 200 and the coordinate system. In some embodiments, the measurement tool 20 may include a gyroscope or other sensor to help determine the orientation of the measurement tool. As shown, the source 22 emits a signal in a plane orthogonal to the bore axis 200 and parallel to the XY plane, which can be broken up into its component parts, $S_y$ and $S_x$. The receiver 24 receives reflected signals in three axes, such that received signals can be broken up into their component parts, $R_x$, $R_y$, and $R_z$. The received signals may further be broken up based on the component of the source 22 signal to which they correspond. That is, the $R_x$ component may be broken up into $S_xR_x$ and $S_yR_x$, the $R_y$ component may be broken up into $S_xR_y$ and $S_yR_y$, and the $R_z$ component may be broken up into $S_xR_z$, and $S_yR_z$. Each of these may correspond to the compressive, P, and shear, S1, S2 components of the reflected signal. For example, for the XZ plane, the P image corresponds to $S_xR_x$, the S1 image corresponds to $S_xR_z$, and the S2 image corresponds to $S_xR_y$. For the YZ plane, the P image corresponds to $S_yR_y$, the S1 image corresponds to $S_yR_z$, and the S2 image corresponds to $S_yR_x$.

Strike is defined as the as the angle of the azimuth of a plane of the detected feature with the borehole. Dip is the angle the detected feature makes with the borehole. Based solely on the 2D images described above for the XZ plane and the YZ plane, the strike and dip values for a detected feature may not be determined. However, by taking into account the $S_xR_y$ and $S_yR_x$ values, strike and dip may be estimated.

Figure 6:
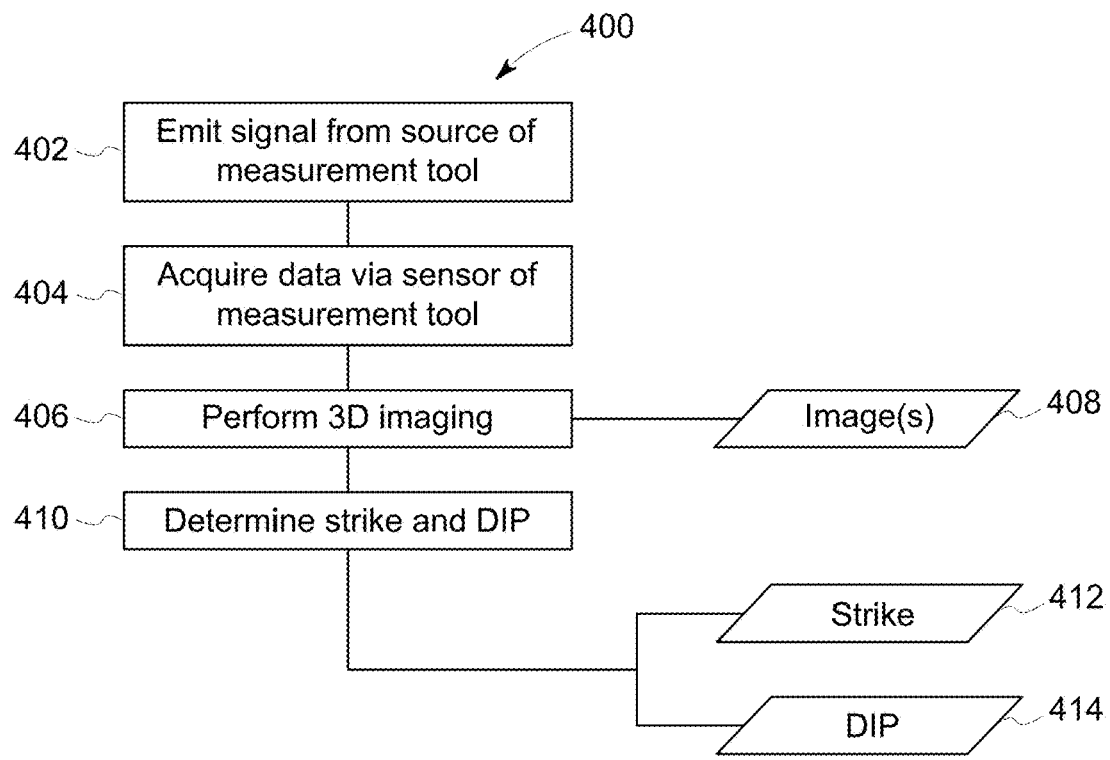
FIG. 6 is a flow chart of a process for taking measurements and generating 3D images of a volume around a bore of the mineral extraction system of FIG. 1, in accordance with an embodiment.

FIG. 6 is a flow chart of a process 400 for taking measurements and generating 3D images of the volume around the bore. In block 402 a signal is emitted from the source of the measurement tool. As previously discussed, the source may emit a signal in a plane parallel to the XY plane and orthogonal to the bore axis into the volume of material surrounding the bore (i.e., cross dipole). In other embodiments, the source may be any device that generates compression and shear waves via an electrical or mechanical excitation process. The source may be any number of devices capable of emitting a signal into the volume of material surrounding the bore. The source may be capable of operating as a monopole, a dipole, or both. The signal penetrates deep (e.g., 30, 40, or 50 meters or more) into the volume of material surrounding the bore such that fractures of a wide range of sizes may be detected. For example, the signal may be emitted at an appropriate frequency that the signal penetrates deep into the volume of material surrounding the bore.

In block 404, the receiver receives signals reflected from features within the volume of material disposed about the bore. The receiver contains one or more sensors capable of receiving the P, S1, and S2 components of the reflected signal. For example, the receiver may have first and second elements oriented in a plane parallel to the XY plane and orthogonal to the bore axis. A third element may be oriented coaxial to or parallel to the bore axis. The P component of the reflected signal travels along the axis of propagation, for isotropic media, the S1 component is polarized in the plane of propagation, and the S2 component is polarized perpendicular to the plane of propagation. As such, the first and second elements oriented in the plane orthogonal to the bore axis receive the P component and the S2 component of the reflected signal. The third element, oriented parallel to the bore axis, receives the S1 component. For anisotropic media, appropriate components of the P, S1, and S2 modes are fully recorded by the three components of the receiver. In some embodiments, the receiver may be a three-component (3C) sensor (e.g., a three-axis magneto resistive sensor, a piezo electric sensor, magnetorestrictive, capacitive sensor, MEMS sensors, etc.). In other embodiments, the receiver may include one or more geophones or accelerometers. In general, the receiver may be any device capable of sensing a vector quantity, such as force, velocity, acceleration, displacement, etc. Further, the receiver may include multiple sensors, either in a single package or in separate packages. In some embodiments, block 404 may include some signal conditioning, such as filtering, fast Fourier transforms (FFT), etc.

In block 406, 3D one or more images 408 are generated using the collected data and output. As discussed with regard to FIG. 5, the source may emit a signal in a plane orthogonal to the bore axis and parallel to the XY plane, which can be broken up into its component parts, $S_y$ and $S_x$. The receiver receives reflected signals in three axes, such that received signals can be broken up into their component parts, $R_x$, $R_y$, and $R_z$. The received signals may further be broken up based on the component of the source signal to which they correspond. That is, the $R_x$ component may be broken up into $S_xR_x$ and $S_yR_x$, the $R_y$ component may be broken up into $S_xR_y$ and $S_yR_y$, and the $R_z$ component may be broken up into $S_xR_z$, and $S_yR_z$. Each of these may correspond to the compressive, P, and shear, S1, S2 components of the reflected signal. By stitching the various components ($S_xR_x$, $S_yR_x$, $S_xR_y$, $S_yR_y$, $S_xR_z$, and $S_yR_z$) together and analyzing the collected data, images may be created of the various features disposed within the volume of material surrounding the bore and extending outward 50 meters or more.

In block 410, strike 412 and dip 414 may be determined and output. As previously discussed with regard to FIG. 5, strike is defined as the angle of the azimuth of a plane of the detected feature with the borehole, and dip is the angle the detected feature makes with the borehole. Once the images 408 of the volume of surrounding the bore have been generated, strike 412 and dip 414 values may be determined directly from the one or more images 408 and output.

Though 3D images allow for more thorough, more complete formation evaluation, and more accurate strike and dip values, 3D imaging may use more processing power and take more time than 2D imaging. Accordingly, in some applications, users may prefer 2D imaging, or may perform 2D imaging as a preliminary step before 3D imaging.

Figure 7:
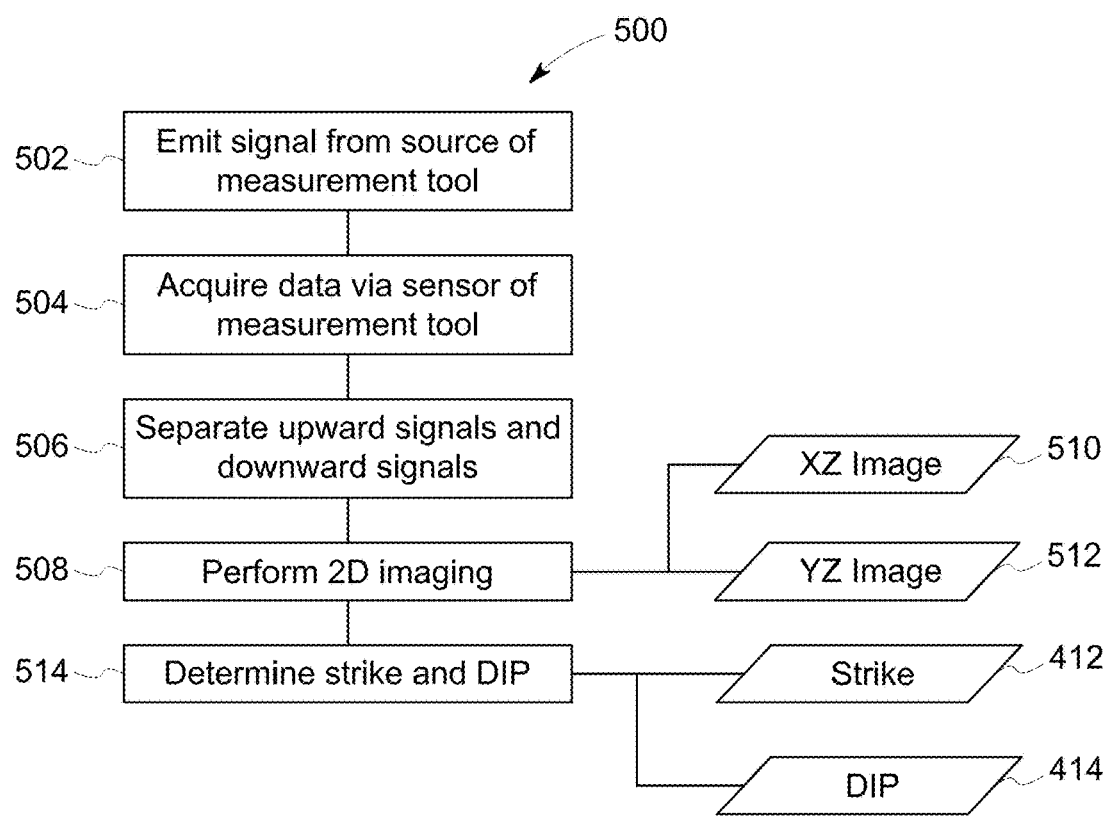
FIG. 7 is a flow chart of a process for taking measurements and generating 2D images of a volume around a bore of the mineral extraction system of FIG. 1, in accordance with an embodiment.

FIG. 7 is a flow chart of a process 500 for taking measurements and generating 2D images of the volume around the bore. In block 502 a signal is emitted from the source of the measurement tool. As previously discussed, the source may emit a signal in a plane parallel to the XY plane and orthogonal to the bore axis into the volume of material surrounding the bore. However, the source may be any number of other devices capable of emitting a signal into the volume of material surrounding the bore. The source may be capable of operating as a monopole, a dipole, 4 pole, 6 pole, 8 pole, etc. The signal penetrates deep (e.g., 30, 40, or 50 meters or more) into the volume of material surrounding the bore such that fractures of a wide range of sizes may be detected. For example, the signal may be emitted at an appropriate frequency to resolve fracture targets and are of adequate strength to interrogate the deep formation.

In block 504, the receiver receives signals reflected from features within the volume of material disposed about the bore. The receiver contains one or more sensors capable of receiving the P, S1, and S2 components of the reflected signal. For example, the receiver may have first and second elements oriented in a plane parallel to the XY plane and orthogonal to the bore axis. A third element may be oriented coaxial to or parallel to the bore axis. The P component of the reflected signal travels along the axis of propagation, in isotropic media the S1 component is polarized in the plane of propagation, and the S2 component is polarized perpendicular to the plane of propagation. As such, the first and second elements oriented in the plane orthogonal to the bore axis receive the P component and the S2 component of the reflected signal. The third element, oriented parallel to the bore axis, receives the S1 component. For anisotropic media, appropriate components of the P, S1, and S2 modes are fully recorded on the 3 components of the receiver. In some embodiments, the receiver may be a three-component (3C) sensor (e.g., a three-axis magneto resistive sensor, a piezo electric sensor, magnetorestrictive, capacitive sensor, MEMS sensors, etc.). In other embodiments, the receiver may include one or more geophones or accelerometers. Further, the receiver may include multiple sensors, either in a single package or in separate packages. In some embodiments, block 504 may include some signal conditioning, such as filtering, fast Fourier transforms (FFT), etc.

In block 506, the collected data is segregated into data for upward moving signals and downward moving signals. The data for upward moving signals and downward moving signals are used separately to generate images and then combined to give an integrated picture.

In block 508, 2D images are generated for the XZ plane 510 and the YZ plane 512 and output. The $S_xR_x$, $S_xR_z$, and $S_yR_y$ data are used to generate the image for the XZ plane 510. In the XZ plane image, the P component corresponds to $S_xR_x$, the S1 component corresponds to $S_xR_z$, and the S2 component corresponds to $S_yR_y$. The $S_yR_y$, $S_yR_z$, and $S_xR_x$ data are used to generate the image for the YZ plane 512. The P component corresponds to $S_yR_y$, the S1 component corresponds to $S_yR_z$, and the S2 component corresponds to $S_xR_x$.

In block 514, strike 412 and dip 414 may be determined. Based solely on the 2D images described above for the XZ plane and the YZ plane, the strike 412 and dip 414 values for a detected feature may not be determined. However, by taking into account the $S_xR_y$ and $S_yR_x$ values, strike 412 and dip 414 may be estimated and output.

The disclosed techniques utilize at least one source and at least one three-component receiver for formation evaluation of a volume of material disposed around a bore and extending outward 50 meters or more. By sensing the compressive component, P, and both shear components, S1 and S2, 2D and/or 3D imaging of the volume may be generated, allowing for estimation of birefringence of the volume, and detection of microfractures several orders of magnitude below the scale of resolution. The source may operate in a monopole mode or multi-mode (i.e., dipole, quadpole, hexpole, octopole, etc.). Further, the disclosed measurement tool and corresponding techniques may be used in cased bores and/or open bores. Further, the disclosed measurement tool may be used during logging while tripping (LWT), logging while drilling (LWD), measurement while drilling (MWD), or wireline operations.

This written description uses examples to disclose the claimed subject matter, including the best mode, and also to enable any person skilled in the art to practice the disclosed subject matter, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A downhole measurement tool configured to be run through a bore, the downhole measurement tool comprising:
   a vibrational source configured to emit a source signal into a volume of material surrounding the bore, wherein the source signal is configured to propagate through the volume of material surrounding the bore and reflect off of features disposed within the volume of material surrounding the bore, wherein the source signal comprises both compressional and shear waves; and
   a three-component receiver, comprising:
      a first element oriented in a first plane, orthogonal to an axis of the bore, wherein the first element is configured to receive a first set of reflections of the source signal;
      a second element oriented in the first plane, orthogonal to the first element, wherein the second element is configured to receive a second set of reflections of the source signal; and
      a third element oriented parallel to the axis, wherein the third element is configured to receive a third set of reflections of the source signal,
   wherein the downhole measurement tool is configured to acquire the received first, second, and third sets of reflections of the source signal; and
   a computing device configured to analyze the received first, second, and third sets of reflections of the source signal and to generate one or more images of the volume of material surrounding the bore based on the first, second, and third sets of reflections of the source signal, wherein the one or more images of the volume of material surrounding the bore comprise one or more 2D images, and wherein the computing device is configured to estimate strike and dip based on the one or more 2D images.

2. The downhole measurement tool of claim 1, wherein the source is configured to emit the source signal along a second plane perpendicular to the bore axis.

3. The downhole measurement tool of claim 1, wherein the first and second sets of reflections comprise a compressive component (P) of the source signal and a second shear component (S2) of the source signal.

4. The downhole measurement tool of claim 3, wherein the third set of reflections comprises a first shear component (S1) of the source signal.

5. The downhole measurement tool of claim 1, wherein the three-component receiver comprises a three-axis magneto resistive sensor.

6. The downhole measurement tool of claim 1, wherein the three-component receiver comprises one or more geophones.

7. The downhole measurement tool of claim 1, wherein the three-component receiver comprises one or more accelerometers.

8. A system, comprising:
   a downhole measurement tool configured to be run through a bore, the downhole measurement tool comprising:

a vibrational source configured to emit a source signal into a volume of material surrounding the bore, wherein the source signal is configured to propagate through the volume of material surrounding the bore and reflect off of features disposed within the volume of material surrounding the bore, wherein the source signal comprises both compressional and shear waves;

a three-component receiver, comprising:
- a first element oriented in a first plane, orthogonal to an axis of the bore, wherein the first element is configured to receive a first set of reflections of the source signal;
- a second element oriented in the first plane, orthogonal to the first element, wherein the second element is configured to receive a second set of reflections of the source signal; and
- a third element oriented parallel to the axis, wherein the third element is configured to receive a third set of reflections of the source signal;

wherein the downhole measurement tool is configured to acquire the received first, second, and third sets of reflections of the source signal; and a computing device configured to analyze the received first, second, and third sets of reflections of the source signal and to generate one or more images of the volume of material surrounding the bore based on the first, second, and third sets of reflections of the source signal, wherein the one or more images of the volume of material surrounding the bore comprise one or more 2D images, and wherein the computing device is configured to estimate strike and dip based on the one or more 2D images.

9. The system of claim 8, wherein the third set of reflections comprises a first shear component (S1) of the source signal.

10. The system of claim 9, wherein the first and second sets of reflections comprise a compressive component (P) of the source signal and a second shear component (S2) of the source signal.

11. The system of claim 8, wherein the three-component receiver comprises a three-axis magneto resistive sensor.

12. The system of claim 8, wherein the one or more images of the volume of material surrounding the bore comprise one or more 3D images.

13. The system of claim 12, wherein the computing device is configured to determine strike and dip based on the one or more 3D images.

14. A method, comprising:
running a downhole measurement tool through a bore;
emitting, via a vibrational source of the downhole measurement tool, a source signal into a volume of material surrounding the bore, wherein the source signal is configured to propagate through the volume of material surrounding the bore and reflect off of features disposed within the volume of material surrounding the bore, wherein the source signal comprises both compressional and shear waves;
receiving, via a first element of a three-component receiver, a first set of reflections of the source signal, wherein the first element is oriented in a first plane, orthogonal to an axis of the bore;
receiving, via a second element of the three-component receiver, a second set of reflections of the source signal, wherein the second element is oriented in the first plane, orthogonal to the first element; and
receiving, via a third element of the three-component receiver, a third set of reflections of the source signal, wherein the third element is oriented parallel to the axis
generating one or more 2D images of the volume of material surrounding the bore based on the first, second, and third sets of reflections of the source signal; and
estimating strike and dip based on the one or more 2D images.

15. The method of claim 14, comprising generating one or more 3D images of the volume of material surrounding the bore based on the first, second, and third sets of reflections of the source signal.

16. The method of claim 15, comprising determining strike and dip based on the one or more 3D images.

* * * * *